United States Patent Office 3,565,837
Patented Feb. 23, 1971

3,565,837
POLYAMIDE RESINS CONTAINING AN N,N'-DIPIPERAZYL COMPONENT
Manfred Drawert, Werne, Christian Burba, Lunen, and Eugen Griebsch, Unna, Germany, assignors to Schering AG, Berlin-Bergkamen, Germany
No Drawing. Filed Mar. 26, 1968, Ser. No. 715,956
Claims priority, application Germany, Apr. 1, 1967, Sch 40,479
Int. Cl. C08g 20/20
U.S. Cl. 260—18
10 Claims

ABSTRACT OF THE DISCLOSURE

Polyamides useful as the hot melt adhesives for vinyl resins are prepared from (A) dicarboxylic acids which preferably contain a polymeric fat acid component, and (B) a diamine mixture containing an N,N'-dipiperazyl compound of the formula:

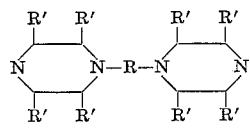

The present invention relates to polyamide polymers and to methods of making the same. More particularly, the invention relates to polyamide polymers incorporating a N,N'-dipiperazyl component therein and having special usefulness as adhesives for vinyl polymers, and to methods of making the same.

A number of polyamides which show good adhesive properties for different substrates and which are employed either as melt-adhesives or as heat-sealing materials are known in the prior art. Nevertheless, these known polyamides have insufficient adhesive strength for vinyl polymers particularly for plasticized polyvinyl chloride. It has not been possible in the past to improve adhesive strength sufficiently by the use of additives. Therefore, up to now, solutions of low molecular weight polyvinyl chloride or of chlorinated rubber, or reactive adhesives comprising polyisocyanates, have been used for the adhesion of these vinyl polymers. These adhesives have considerable physiological and technical disadvantages associated with the use of solvents or with the toxicity of polyisocyanates.

According to the present invention, polyamides have been prepared which have outstanding adhesive properties for vinyl compounds such as polyvinyl chloride, as well as for other substrates.

The polyamides of the invention are condensation products of (A) a dicarboxylic acid component, and (B) a diamine component including an N,N'-dipiperazyl compound.

The dicarboxylic acid component (A) comprises (1) a polymeric fatty acid; or (2) some other aliphatic, cycloaliphatic, or aromatic dicarboxylic acid; or (3) a mixture of a polymeric fatty acid as in (1) with some other dicarboxylic acid as in (2). The diamine component (B) comprises: (1) an aliphatic, cycloaliphatic, aromatic, araliphatic, or heterocyclic diamine, suitably including a hydrocarbon radical comprising from 2 to 36 carbon atoms, and having primary and/or secondary amino groups; and (2) an N,N'-dipiperazyl compound of the formula

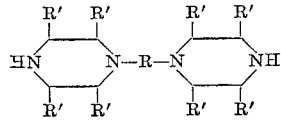

wherein R' is hydrogen or alkyl having 1 to 6 carbon atoms, suitably methyl, and R is an aliphatic radical having from 2 to 12 carbon atoms, suitably a hydrocarbon radical or hydrocarbon radical interrupted by one or two ether bridges, a cycloaliphatic or aliphatic-cycloaliphatic radical, or an araliphatic radical. In the diamine component (B), the ratio of equivalents of component (B)(1) and the dipiperazyl component (B)(2) is suitably between 0.8:0.2 and 0.1:0.9.

The polyamides of the present invention are prepared by heating the polymeric fatty acids and/or other dicarboxylic acids of the acid component (A), or amide forming derivatives of these acids, with the diamine component (B) at temperatures from about 100° C. to about 300° C., suitably with the application of reduced pressure (0.5–25 mm. Hg) during the last condensation stages for removal of easily volatile cleavage products such as water or alcohol. As the amide-forming derivatives of the acids, the carboxylic acid esters are of particular interest, particularly those such as the methyl- and ethyl-esters, which easily undergo aminolysis. In general, substantially equivalent quantities of the carboxylic acids and amino compounds are reacted, but a slight excess of either the acid or amine component can be used.

The polymeric fatty acids employed in the polyamide polymers of the invention suitably contain between about 65 percen and 100 percent of dimeric fatty acid and are prepared either by free radical or ionic polymerization, or by thermal dimerization, of a monomeric fatty acid. The monomeric fatty acid can be a saturated, or ethylenically or acetylenically unsaturated natural or synthetic aliphatic mono-basic acid having from 8 to 24 carbon atoms. These fatty acids can be polymerized in different ways, but give functionally similar products which can be characterized generally as polymeric fatty acids. The latter usually contain a predominant part of dimeric fatty acid and smaller amounts of trimeric or higher polymeric acids as well as monomeric fatty acids.

The polymerization of a saturated fatty acid can take place at elevated temperatures with peroxide catalysts such as di-t-butyl peroxide, for example. Because of the small yields, this process is of little interest. In the process, saturated fatty acids, both branch chain and straight chain materials, can be employed, such as caprylic acid, pelargonic acid, capric acid, lauric acid, myristic acid, palmitic acid, isopalmitic acid, stearic acid, arachidic acid, behenic acid, and lignoceric acid.

It is much more common to polymerize ethylenically unsaturated fatty acids. This can be done with or without catalysts, with higher temperatures being required for the uncatalyzed polymerization. Suitable catalysts are acid ar alkaline clays, di-t-butyl peroxide, boron trifluoride and other Lewis acids, anthraquinone, sulfur trioxide, and the like. Mono- and/or poly-ethylenically unsaturated acids, both branch chain and straight chain materials can be employed, such as, for example, 3-octene acid, 11-dodecene acid, linderic acid, lauroleinic acid, oleic acid, elaidic acid, vaccenic acid, gadoleic acid, cetoleic acid, nervonic acid, erucic acid, linoleic acid, linolenic acid, aloeostearic acid, arachidonic acid, clupanodonic acid, nisinic acid, and chaulmoogra oil acid.

Acetylenically unsaturated fatty acids can be polymerized in the absence of catalyst because of the higher reactivity of the materials. However, they are rare in nature and are expensive to synthesize. For this reason, they are economically of little interest. However, a number of acetylenically unsaturated fatty acids, both straight chain and branch chain, mono- and/or poly-unsaturated materials, are suitable for the preperation of polymeric fatty acids, for example 6-octadecyne acid, 9-octadecyne acid, 13-dokosyne acid, and 17-octadecene-9,11-diyne acid.

The usual approximate composition of commercially available dimeric fatty acids, prepared from unsaturated $C_{18}$ fatty acid, is 5–15% by weight of $C_{18}$-monocarboxylic acid,
60–80% by weight of $C_{36}$-dicarboxylic acid,
10–35% by weight of $C_{54}$- (and higher) tricarboxylic acids.

The mixtures obtained by polymerization can be fractionated by conventional distillation or solvent extraction methods. The acids can be hydrogenated before or after distillation in order to decrease the degree of unsaturation.

The concept "polymeric fatty acid" herein comprises not only homopolymeric fatty acids but also copolymeric fatty acids, that is polycarboxylic acids in which two or more fatty acid molecules are directly bonded, or are bound by cocomponents present as bridging members or in some other way. To prepare these copolymers, unsaturated fatty acids or their esters are copolymerized with conventional polymerizable comonomers such as vinyl aromatic compounds, acyl compounds, cumarone, indene, and the like.

Instead of polymerized fatty acids, other dicarboxylic acids suitable having up to 10 carbon atoms can also be employed, either alone or in admixture with the fatty acids, to prepare the polyamides of the present invention. Such dicarboxylic acids include, for example: aliphatic dicarboxylic acids such as oxalic, adipic, pimelic, suberic, azelaic, sebacic, and decane dicarboxylic acids; aromatic or araliphatic dicarboxylic acids which may be alkyl-substituted, such as terephthalic acid, phenylene diacetic acid, and dimethyl phenylene diacetic acid; mixtures of aliphatic and aromatic or araliphatic dicarboxylic acids; and also dicarboxylic acids having 1 or 2 hetero atoms such as oxygen in the form of ether bridges, e.g., 3,8-dioxadecane-1,10-dicarbixylic acid.

As component (1) of the diamine component of the above-mentioned polyamides, all diprimary aliphatic, cycloaliphatic, and aromatic diamines having an organic radical of from 2 to 36 carbon atoms are suitable. The radical is preferably hydrocarbon, but the main chain can also be interrupted by hetero atoms such as oxygen. Exemplary of such amines are: ethylene diamine; 1,3-propylene diamine; 1,4-butylene diamine; pentamethylene diamine; hexamethylene diamine; nona-, deca-, and dodecamethylene diamine; the diamines obtained, for example, by the reduction of dinitriles of dimerized fatty acids; 1,2-propylene diamine; 1,3-diamino butane; trimethyl hexamethylene diamine (suitably as an isomeric mixture of the 2,4,4- and 4,2,2-isomers); aminomethyl stearyl amine; 8- or 9-amino stearyl amine, and the like; cyclohexyl diamine; bis-(aminomethyl)-cyclohexane; diaminodicyclohexylmethane; 3,5,5-trimethyl-3-aminomethyl-cyclohexylamine; bis-(aminoethyl)-benzene; bis-(aminomethyl)-xylene; diamino-diphenylmethane; and ether diamines prepared, for example, by cyanoethylation of diols with subsequent reduction, e.g., 1,12-diamino-4,9-dioxadodecane. Heterocyclic amines having secondary amino groups may also be employed, such as piperazine, N-amino-ethyl piperazine, or 1,2-dimethyl-2-aminopropyl-piperidine.

The dipiperazyl compounds to be used as codiamines in the preparation of the polyamides of the present invention can be prepared according to methods known in the prior art or by reaction of piperazine with dichloro compounds of the general formula

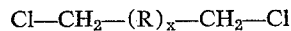

$$Cl-CH_2-(R)_x-CH_2-Cl$$

in which $x$ is 0 or 1 and in which R can be a linear or branched alkyl radical having up to 10 carbon atoms, preferably up to 6 carbon atoms, which may be interrupted by one or more oxygen atoms. R can also be a divalent hydroaromatic or aromatic radical. The dichloro compounds are reacted with at least a fourfold molar excess of piperazine per mol of dichloro compound and the N,N'-dipiderazyl product is then isolated from the reaction mixture according to known techniques.

Preferred polyamides prepared according to the present invention have good water resistance as well as good resistance to cracking in the cold. The polyamides prepared from suitable diamines without polymeric fatty acids show outstanding adhesive properties as evidenced by their resistance to peeling, for which values as high as 16 kg./cm. are reached. In the preparation of polyamides which contain no polymerized fatty acids, it is appropriate to employ a diamine having more than four carbon atoms in the chain between amine groups in combination with an N,N'-dipiperazyl compound.

If a codiamine comprising a linear aliphatic radical having from 2 to 12 carbon atoms is present, then the polyamides of the invention in all cases show a good adhesion to the most diverse substrates. Particularly good adhesive properties are obtained with a chain length of the linear radical between 2 and 6 carbon atoms. Adhesive values at room temperature decrease with an increasing number of carbon atoms in the radical. However, good adhesive values are still observed in polyamides in which the amine radicals contain 12 or more carbon atoms. At low temperatures—below 0° C.—this relationship in the adhesives is inverted, that is by increasing the C-number, the adhesive strength is increased. In addition to the chain length of the radical, the composition of the diamine component (B) plays an important role. Thus, when the equivalent ratio of the diamines of the group (B)(1) to the N,N'-dipiperazyl compounds (B)(2) is between 0.5:0.5 and 0.35:0.65, the adhesive strength of the corresponding polyamides is maximized.

The polyamides according to the present invention, which include at least one N,N'-dipiperazyl compound, show a surprisingly high adhesion, particularly for such vinyl polymers as have heretofore showed little or no adhesion for thermoplastic polyamides. The vinyl polymers include, for example, not only hard polyvinyl chloride but, particularly, also plasticized kinds which can now be adhered. In addition to the polymers mentioned, other substrates such as steel, aluminum, leather, rubber, wood, textiles, glass, and the like can be adhered. The advantages of the polyamide melt adhesives of the present invention for polyvinyl chloride over the adhesives heretofore used in the form of solutions are self-evident.

It is noteworthy that although a thermoplastic melt adhesive is involved, adhesive bonds remain intact even at temperatures below 0° C. Also, substrates such as polyvinyl chloride cannot only be bonded to each other, but also to a number of other substrates like those mentioned above.

A better understanding of the present invention and of its many advantages will be had by reference to the following specific examples, given by way of illustration.

EXAMPLE 1

510 g. of polymerized tall oil fatty acid containing 97 percent of dimeric fatty acid (0.65 equivalent) were warmed to 60° C. under nitrogen with 96.5 g. of sebacic acid (0.35 equivalent). 41.2 grams of ethylene diamine (0.5 equivalent) and 137 g. N,N'-dipiperazyl ethane (0.5 equivalent) were added and the temperature was raised to 230° C. over two hours. The temperature was then held for four hours at 230° C. During the last two hours a vacuum of 14 mm./Hg was applied for improved removal of the water of reaction. The polyamide resin obtained had a ring and ball softening point of 131° C. and showed a peel resistance of 7.4 kg./cm. on plasticized polyvinyl chloride.

In the examples given in following Table I, the polymers were prepared in an analogous manner using polymerized tall oil fatty acid with a variable content of dimeric fatty acid. Their properties are reported in Table II.

TABLE I

| Example | Dimeric fatty acid content, percent | Other acid | Equivalents fatty acid/ other acid | Diamine | N,N'-dipiperazyl co-diamine R= | Equivalents diamine/ co-diamine |
|---|---|---|---|---|---|---|
| 2 | 90 | Sebacic | 0.65/0.35 | Ethylene diamine (ED) | $-(CH_2)_2-$ | 0.5/0.5 |
| 3 | 73 | do | 0.75/0.25 | do | $-(CH_2)_2-$ | 0.5/0.5 |
| 4 | 97 | do | 0.67/0.33 | do | $-(CH_2)_3-$ | 0.5/0.5 |
| 5 | 97 | do | 0.60/0.40 | do | $-(CH_2)_6-$ | 0.5/0.5 |
| 6 | 97 | do | 0.65/0.35 | do | $-(CH_2)_{12}-$ | 0.5/0.5 |
| 7 | 97 | do | 0.70/0.30 | do | DDB | 0.5/0.5 |
| 8 | 97 | DMD | 0.70/0.30 | do | $-(CH_2)_6-$ | 0.6/0.4 |
| 9 | 97 | Adipic | 0.70/0.30 | do | $-(CH_2)_6-$ | 0.4/0.6 |
| 10 | 97 | do | 0.20/0.80 | do | $-(CH_2)_6-$ | 0.1/0.9 |
| 11 | 97 | Sebacic | 0.60/0.40 | do | $-(CH_2)_2-$ | 0.4/0.6 |
| 12 | 97 | do | 0.40/0.60 | do | $-(CH_2)_2-$ | 0.1/0.9 |
| 13 | 97 | do | 0.70/0.30 | do | $-(CH_2)_2-$ | 0.6/0.4 |
| 14 | 97 | do | 0.80/0.20 | do | $-(CH_2)_2-$ | 0.7/0.3 |
| 15 | 97 | do | 0.50/0.50 | do | $-(CH_2)_2-$ | 0.3/0.7 |
| 16 | 90 | Azelaic | 0.60/0.40 | 1,6-diamino-hexane | $-(CH_2)_2-$ | 0.4/0.6 |
| 17 | 90 | Adipic | 0.70/0.30 | TMD | $-(CH_2)_2-$ | 0.5/0.5 |
| 18 | 90 | DMD | 0.70/0.30 | TAC | $-(CH_2)_2-$ | 0.4/0.6 |
| 19 | | do | 0.00/1.00 | TMD | $-(CH_2)_2-$ | 0.5/0.5 |
| 20 | | Adipic | 0.00/1.00 | DDD | $-(CH_2)_2-$ | 0.5/0.5 |
| 21 | 96 | Azelaic | 0.65/0.35 | ED/AEP 0.5/0.3 | $-(CH_2)_2-$ | 0.8/0.2 |
| 22 | 96 | do | 0.65/0.35 | ED/Piperazine 0.4/0.3 | $-(CH_2)_2-$ | 0.7/0.3 |
| 23 | 96 | Terephthalic | 0.95/0.05 | Ethylene diamine | $-(CH_2)_6-$ | 0.5/0.5 |
| 24 | 96 | do | 1.00/0.00 | do | $-(CH_2)_6-$ | 0.6/0.4 |
| 25 | 96 | Phenylenediacetic | 0.95/0.05 | do | $-(CH_2)_6-$ | 0.4/0.6 |
| 26 | 96 | Sebacic | 0.65/0.35 | do | $-(CH_2)_2-O-CH_2-O-(CH_2)_2-$ | 0.5/0.5 |
| 27 | | Adipic | 0.00/1.00 | $C_{36}$-diamine | $-(CH_2)_2-$ | 0.6/0.4 |

DMD = decamethylene dicraboxylic acid.
TMD = trimethyl-hexamethylene diamine (mixture of 2,2,4- and 4,4,2-isomers).
TAC = 3,5,5-trimethyl-3-aminomethyl-cyclohexane.
DDD = 1,12-diamino-4,9-dioxa-dodecane.
AEP = N-aminoethyl-piperazine.
DDB = 1,4-dimethylene-2,5-dimethyl-benzene.
$C_{36}$-diamine = diamine obtained from polymerised tall oil fatty acid.

TABLE II

| Example | Ring and ball softening point, °C. | Peel resistance at room temperature (kg./cm.) | | |
|---|---|---|---|---|
| | | Plasticized PVC | Steel | Rubber on leather |
| 2 | 141 | 3.7 | | |
| 3 | 126 | 3.2 | | |
| 4 | 144 | 3.4 | 4.1 | 5.2 |
| 5 | 135 | 5.1 | | |
| 6 | 143 | 3.3 | | 4.3 |
| 7 | 114 | 4.1 | 6.0 | 3.8 |
| 8 | 150 | | 5.2 | |
| 9 | 147 | 3.2 | | |
| 10 | 180 | | 1.7 | |
| 11 | 128.5 | 5.1 | 9.3 | 3.4 |
| 12 | 168 | | 3.5 | |
| 13 | 147 | 2.5 | | |
| 14 | 143 | 5.8 | | |
| 15 | 151 | | 7.5 | |
| 16 | 164 | | 13.2 | |
| 17 | 112.5 | 2.0 | 8.6 | |
| 18 | 121.5 | 3.1 | 13.5 | |
| 19 | 137.5 | 5.3 | 16.2 | |
| 20 | 149.5 | 6.0 | 15.9 | |
| 21 | 129 | 6.7 | | |
| 22 | 132 | 1.4 | | |
| 23 | 88 | 2.0 | | |
| 24 | 104.5 | 4.4 | | |
| 25 | 87 | 1.8 | | |
| 26 | 147 | 2.5 | | |
| 27 | 147 | 2.7 | | |

We claim:
1. The method of making a polyamide resin which comprises condensing, at a temperature from about 100° C. to about 300° C., substantially equivalent amounts of:
   (A) an acid component comprising a member selected from the group consisting of:
   (1) a fatty acid polymer comprising between about 65 and 100 percent of dimeric fatty acid;
   (2) some other aliphatic or aromatic dicarboxylic acid; and
   (3) a mixture of (A)(1) and (A)(2); and
   (B) a diamine component consisting essentially of a mixture of:
   (1) a heterocyclic diamine or a diamine of an aliphatic hydrocarbon or of an aliphatic hydrocarbon having ether oxygen atoms in the hydrocarbon chain, or a diamine of a cycloaliphatic, aromatic, or araliphatic hydrocarbon, each said diamine having 2 to 36 carbon atoms and being free of tertiary and quaternary amino groups; and
   (2) an N,N'-dipiperazyl compound of the formula

$$HN{\overset{R'}{\underset{R'}{\diagdown}}}{\overset{R'}{\underset{R'}{\diagup}}}N-R-N{\overset{R'}{\underset{R'}{\diagdown}}}{\overset{R'}{\underset{R'}{\diagup}}}NH$$

wherein R' is hydrogen or alkyl having 1 to 6 carbon atoms and R is a member selected from the group consisting of aliphatic and araliphatic radicals having from 2 to 12 carbon atoms, the ratio of equivalents of diamine components (B)(1) to said N,N'-dipiperazyl compound (B)(2) being between 0.8:0.2 and 0.1:0.9.

2. A method as in claim 1 wherein said acid component (A) is mixture (A)(3); wherein said diamine component (B)(1) is an aliphatic diprimary diamine comprising a linear hydrocarbon chain of from 2 to 12 carbon atoms between the primary amino groups; and wherein R' is hydrogen and R is an aliphatic hydrocarbon having 2 to 12 carbon atoms.

3. A method as in claim 1 wherein said acid component (A)(3) is a mixture of a largely dimeric fatty acid and a member selected from the group consisting of sebacic, adipic, azelaic, and decamethylene dicarboxylic acids.

4. A method as in claim 1 wherein said diamine component (B)(1) is ethylene diamine.

5. A method as in claim 1 wherein said N,N'-dipiperazyl compound is N,N'-dipiperazyl-ethane.

6. A polyamide prepared as in claim 1.
7. A polyamide prepared as in claim 2.
8. A polyamide prepared as in claim 3.
9. A polyamide prepared as in claim 4.
10. A polyamide prepared as in claim 5.

References Cited

UNITED STATES PATENTS

| | | | |
|---|---|---|---|
| 3,377,303 | 4/1968 | Peerman et al. | 260—268X |
| 3,364,218 | 1/1968 | Brader et al. | 260—268 |
| 3,269,999 | 8/1966 | Moore et al. | 260—18X |
| 2,379,413 | 7/1945 | Bradley | 260—18X |

DONALD E. CZAJA, Primary Examiner

C. W. IVY, Assistant Examiner

U.S. Cl. X.R.

156—306, 331; 161—227, 247; 260—23, 78, 268, 404.5